(12) United States Patent
Kim et al.

(10) Patent No.: US 10,587,844 B2
(45) Date of Patent: Mar. 10, 2020

(54) IMAGE ANALYSIS SYSTEM FOR ANALYZING DYNAMICALLY ALLOCATED CAMERA IMAGE, INTEGRATED CONTROL SYSTEM INCLUDING SAME, AND OPERATION METHOD THEREFOR

(71) Applicants: Su Nam Kim, Anyang-si (KR); Hyung Heon Kim, Seoul (KR)

(72) Inventors: Su Nam Kim, Anyang-si (KR); Hyung Heon Kim, Seoul (KR)

(73) Assignee: INNODEP CO., LTD., Seoul (KR)

( * ) Notice: Subject to any disclaimer, the term of this patent is extended or adjusted under 35 U.S.C. 154(b) by 29 days.

(21) Appl. No.: 15/514,458

(22) PCT Filed: Feb. 25, 2015

(86) PCT No.: PCT/KR2015/001793
§ 371 (c)(1),
(2) Date: Mar. 24, 2017

(87) PCT Pub. No.: WO2016/133234
PCT Pub. Date: Aug. 25, 2016

(65) Prior Publication Data
US 2017/0359553 A1    Dec. 14, 2017

(30) Foreign Application Priority Data

Feb. 17, 2015  (KR) .................. 10-2015-0024009
Feb. 17, 2015  (KR) .................. 10-2015-0024010

(51) Int. Cl.
*H04N 7/18*      (2006.01)
*G06K 9/00*     (2006.01)
(Continued)

(52) U.S. Cl.
CPC ......... *H04N 7/181* (2013.01); *G06K 9/00718* (2013.01); *G06K 9/00771* (2013.01);
(Continued)

(58) Field of Classification Search
CPC .... H04N 7/181; H04N 7/18; H04N 21/21805; H04N 21/231; H04N 21/23418;
(Continued)

(56) References Cited

U.S. PATENT DOCUMENTS

| 8,350,908 B2 * | 1/2013 | Morris | G06K 9/00295 |
|---|---|---|---|
| | | | 348/143 |
| 2004/0105005 A1 * | 6/2004 | Yamamoto | G08B 13/19656 |
| | | | 348/159 |

(Continued)

FOREIGN PATENT DOCUMENTS

| KR | 10-2004-0016591 A | 2/2004 |
|---|---|---|
| KR | 10-2011-0023632 A | 3/2011 |

(Continued)

*Primary Examiner* — William C Vaughn, Jr.
*Assistant Examiner* — Jae N Noh
(74) *Attorney, Agent, or Firm* — John K. Park; Park Law Firm

(57) ABSTRACT

The operation method of integrated control system according to an embodiment of the present invention comprises the steps of: providing an event detection request to the video analysis server; detecting an event by analyzing videos from at least one camera which are allocated to each video analysis server in accordance with default configuration; selecting at least one correlated camera corresponding to event-detecting camera by analyzing table information stored in the monitoring client as well as the event detection result; newly allocating the correlated camera to the at least one video analysis server; and detecting an event in each of the video analysis server by analyzing videos from the newly-allocated correlated camera.

3 Claims, 15 Drawing Sheets

(51) Int. Cl.
  *H04N 21/218* (2011.01)
  *H04N 21/231* (2011.01)
  *H04N 21/234* (2011.01)
  *H04N 21/239* (2011.01)

(52) U.S. Cl.
  CPC ..... *G06K 9/00979* (2013.01); *G06K 9/00993* (2013.01); *H04N 7/18* (2013.01); *H04N 21/21805* (2013.01); *H04N 21/231* (2013.01); *H04N 21/2393* (2013.01); *H04N 21/23418* (2013.01); *G06K 2009/00738* (2013.01)

(58) Field of Classification Search
  CPC ........... H04N 21/2393; G06K 9/00718; G06K 9/00771; G06K 2009/00738
  USPC ......................................................... 348/159
  See application file for complete search history.

(56) References Cited

U.S. PATENT DOCUMENTS

| | | | | |
|---|---|---|---|---|
| 2005/0206726 | A1* | 9/2005 | Yoshida | H04N 7/181 348/143 |
| 2013/0166711 | A1* | 6/2013 | Wang | H04N 7/181 709/223 |
| 2016/0005281 | A1* | 1/2016 | Laska | G06K 9/00771 348/143 |
| 2016/0042621 | A1* | 2/2016 | Hogg | G06K 9/00771 348/155 |

FOREIGN PATENT DOCUMENTS

| | | |
|---|---|---|
| KR | 10-1119084 B1 | 3/2012 |
| KR | 10-2012-0118790 A | 10/2012 |
| KR | 10-1332754 B1 | 11/2013 |
| KR | 10-2014-0003668 A | 1/2014 |
| KR | 10-2014-0120247 A | 10/2014 |

\* cited by examiner

FIG. 8

| CCTV ID | Latitude Coordinates | Longitude Coordinates | Road Information | Group Information |
|---------|----------------------|------------------------|------------------|-------------------|
| CCTV #1 | Info 1_1 | Info 1_2 | Info 1_3 | Info 1_4 |
| CCTV #2 | Info 2_1 | Info 2_2 | Info 2_3 | Info 2_4 |
| CCTV #3 | Info 3_1 | Info 3_2 | Info 3_3 | Info 3_4 |
| ⋮ | ⋮ | ⋮ | ⋮ | ⋮ |
| CCTV #A | Info A_1 | Info A_2 | Info A_3 | Info A_4 |

FIG. 13

| Index | TAG1 | TAG2 | Time/Date | CCTV ID | Position | ••• |
|---|---|---|---|---|---|---|
| Meta Data | Normal | Normal | Info_TD | Info_ID | Info_sav | ••• |
| | 01 | 010 | Info_TD | Info_ID | Info_sav | ••• |
| | 01 | 100 | Info_TD | Info_ID | Info_sav | ••• |
| | 10 | 001 | Info_TD | Info_ID | Info_sav | ••• |
| | ⋮ | ⋮ | ⋮ | ⋮ | ⋮ | ⋮ |

FIG. 14

| TAG1 | TAG2 |
|---|---|
| Singular Behavior (01) | Prowling / Intrusion (001) |
| | Crowding (010) |
| | Losting of Belongings (100) |
| | ⋮ |
| Object (10) | People (001) |
| | Color / Size (010) |
| | Speed / Vehicle (100) |
| | ⋮ |

IMAGE ANALYSIS SYSTEM FOR ANALYZING DYNAMICALLY ALLOCATED CAMERA IMAGE, INTEGRATED CONTROL SYSTEM INCLUDING SAME, AND OPERATION METHOD THEREFOR

FIELD OF THE INVENTION

The present invention relates to a storage/distribution server, video analysis system, an integrated control system including the same, and an operation method for the integrated control system.

BACKGROUND ART

Conventionally, a plurality of cameras has been installed in roadways or sidewalks for the purpose of city management or proof of criminal evidence. The cameras are generally closed-circuit televisions (CCTV's). The control center (or, the integrated control system) may perform monitoring operation by watching videos which have been received from a plurality of CCTV's over the city.

However, the apparatus (e.g., video analysis server) which may detect any possible singular situations by precisely analyzing the videos obtained from the CCTV's is generally very expensive. Besides, considering the time duration required for the video analysis, there is a limit in the number of CCTV's which a video analysis server can deal with. Accordingly, the integrated control system is equipped with a small number of video analysis servers so that the video analysis may be performed on the videos from only a part of the CCTV's.

Therefore, in the conventional art as above, the integrated control system may fail to detect some of event situations. Further, the integrated control system may fail to cope with event situation which has been occurred by moving objects.

DISCLOSURE OF INVENTION

Technical Problem

The present invention is proposed in order to solve the above problem. It is, therefore, an object of the present invention to provide a storage/distribution server, video analysis system, an integrated control system including the same, and an operation method for the integrated control system which may improve the detection capability of any singular situations, may actively respond to the moving objects which causing the singular situations, and may promptly provide analysis result in response to any user's request of event detection.

Technical Solution

In order to achieve the object as above, the operation method of integrated control system according to an embodiment of the present invention in which the integrated control system has a monitoring client and at least one video analysis server, the method comprising the steps of: providing an event detection request to the video analysis server; detecting an event by analyzing videos from at least one camera which are allocated to each video analysis server in accordance with default configuration; selecting at least one correlated camera corresponding to event-detecting camera by analyzing table information stored in the monitoring client as well as the event detection result; newly allocating the correlated camera to the at least one video analysis server; and detecting an event in each of the video analysis server by analyzing videos from the newly-allocated correlated camera.

Further, the operation method of integrated control system according to an embodiment of the present invention in which the integrated control system has a master server and at least one storage/distribution server, the method comprising the steps of: receiving video from a plurality of cameras; analyzing the received video in real-time manner in each of the at least one storage/distribution server; detecting an event based on the video analysis result so as to generate metadata including tag information indicating type of the detected event; storing the generated metadata in the master server; and controlling the event-detected video and at least one information associated thereto be provided to a client by performing search operation for the stored metadata in the master server in response to a request from the client.

Advantageous Effects

The present invention may provide an advantage that the cost for installing the storage/distribution server may be reduced. Further, the present invention may provide another advantage that a small number of video analysis servers may provide video analysis for a large number of the cameras in the integrated control system.

BRIEF DESCRIPTION OF THE DRAWINGS

FIG. 8 is a view illustrating an example of CCTV table information which is stored in the monitoring client according to an embodiment of the invention.

FIG. 13 shows an example of metadata which is stored on the master server.

FIG. 14 shows an example of TAGs corresponding to event types.

EMBODIMENT FOR CARRYING OUT THE INVENTION

Figure 1:
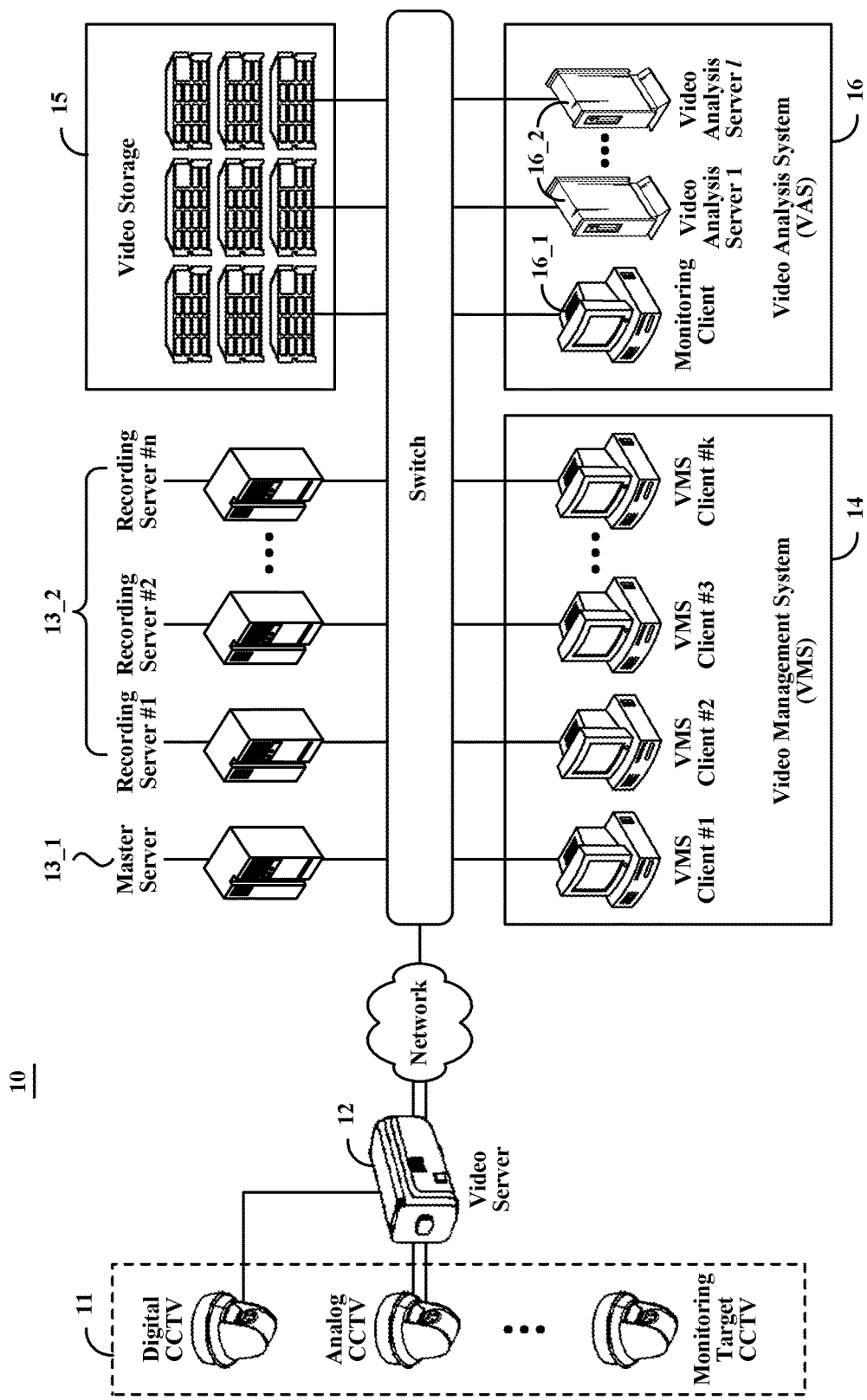
FIG. 1 is a view illustrating an integrated control system according to an embodiment of the present invention.

In order to fully understand the present invention as well as advantages and objectives achieved by the practice of the invention, the accompanying drawings which illustrating the preferred embodiments of the invention shall be referred.

The present invention shall be described in detail as below by describing the preferred embodiments of the invention with referring to the accompanying drawings. The same reference numerals in the drawings denote the same elements.

FIG. 1 is a view illustrating an integrated control system according to an embodiment of the present invention. As shown in FIG. 1, the integrated control system 10 may include master server 13_1, at least one recording server (Recording Server #1 Recording Server # n) 132, video management system (VMS) 14, video storage 15, and video analysis system (VAS) 16.

The recording server 13_2 receives videos from a plurality of cameras via network, distributes the videos to various servers and client in the integrated control system 10 or manages to store the video in the video storage 15, by which the recording server 13_2 may be referred to as a storage/distribution server. Hereinafter, the recording server 13_2 is referred to as a storage/distribution server in the embodiment of the present invention.

The video management systems (VMS) 14 may include at least one VMS client (VMS Client #1~VMS Client # k). The video analysis system 16 may include monitoring client 16_1, and at least one video analysis server (VAS #1~VAS #1) 16_2. Further, the video storage 15 may include a plurality of video storage devices. In FIG. 1, there are further illustrated a plurality of CCTV's 11 and a video server 12 which are connected to the integrated control system 10 via the network. The plurality of CCTV's 11 may include various types of CCTV's, e.g., digital CCTV's and analog CCTV's. The video server 12 may perform predetermined signal processing on the video from the plurality of CCTV's, and then supply the signal-processed video to the integrated control system 10 via network.

The plurality of CCTV's 11 may be installed in a zone where the integrated control system 10 provides a management service. The panning, tilt and zoom (PTZ) of the plurality of CCTV's 11 may be provided through user's operations in the integrated control system 10. Alternatively, the PTZ of the plurality of CCTV's may be automatically controlled by a control means of the integrated control system 10.

An embodiment of systems, servers and clients which comprising the integrated control system 10 is shown in FIG. 1. The integrated control system 10 may be variously implemented in the present invention. For example, the integrated control system 10 may include more than one master servers 13_1 or more than one monitoring clients 16_1. Further, FIG. 1 illustrates n storage/distribution servers 13_2, k VMS clients and l video analysis servers 162, in which each number of the servers or clients may be variously modified.

The master server 13_1 may perform operations which are related to general management of the integrated control system 10. For example, the master server 13_1 may store information which is related to the plurality of CCTV's 11, and may control the storage/distribution servers 13_2 with reference to the stored information when videos are received from the plurality of CCTV's 11. As an embodiment, the master server 13_1 may confirm the CCTV ID information which may be included in the received videos, and may control each of the storage/distribution servers 13_2 so as to process the video which is allocated thereto. As the information which is related to the plurality of CCTV's 11, the master server 13_1 may store the ID information of each CCTV, the placement information such as the latitude and longitude coordinates of each CCTV, and the allocation information between CCTV's and the storage/distribution servers 13_2. Further, the master server 13_1 may control the storage/distribution servers 13_2 with reference to the information in managing the received videos.

Each of the storage/distribution servers 132 may control the switch so as to control the video pathways. For example, each storage/distribution server 13_2 may confirm the CCTV information corresponding to the video which is delivered via the switch by the control of the master server 13_1. Further, each storage/distribution server 132 may control the switch so as to make the video be stored in a corresponding location in the video storage 15. In addition, each storage/distribution server 13_2 may control the switch so as to control the video pathway between the video storage 15 and the video management system 14 in response to a request from the video management system 14, by which the video stored in the video storage 15 shall be provided to the video management system 14. In addition, each storage/distribution servers 13_2 may control the switch so as to control the video pathway between the video storage 15 and the video analysis system 16 in response to a request from the monitoring clients 16_1, by which the video stored in the video storage 15 shall be provided to the video analysis servers 16_2.

In accordance with the operations as described above, the user who manages the VMS client of the video management system 14 may check videos from the CCTV's 11. Also, the user who manages the monitoring client 16_1 of the video analysis system 16 may check the video analysis result of the video analysis server 16_2 as well as its corresponding video, by which he may cope with the event situations.

According to an embodiment of the invention, the monitoring client 16_1 may perform dynamic allocation so as to allocate the CCTV's to the video analysis servers 16_2. More specifically, the monitoring client 16_1 may perform an operation of assigning a plurality of CCTV's 11 to at least one video analysis server 162, in which the assignment may be dynamically carried out according to the event detection result. The dynamic allocation may be defined in various ways. For example, the CCTV's which are allocated to each of the video analysis servers 162 may be modified in association with the event situations. As an embodiment, when an event such as singular behavior is detected, the CCTV's which are allocated to the video analysis servers 16_2 may be automatically modified by intensively monitoring the videos from its neighboring CCTV's of the event location and by managing dynamic allocation table for this dynamic allocation. Thus, the resource usage of the integrated control system 10 may be maximized and the control efficiency may be improved.

Figure 2:
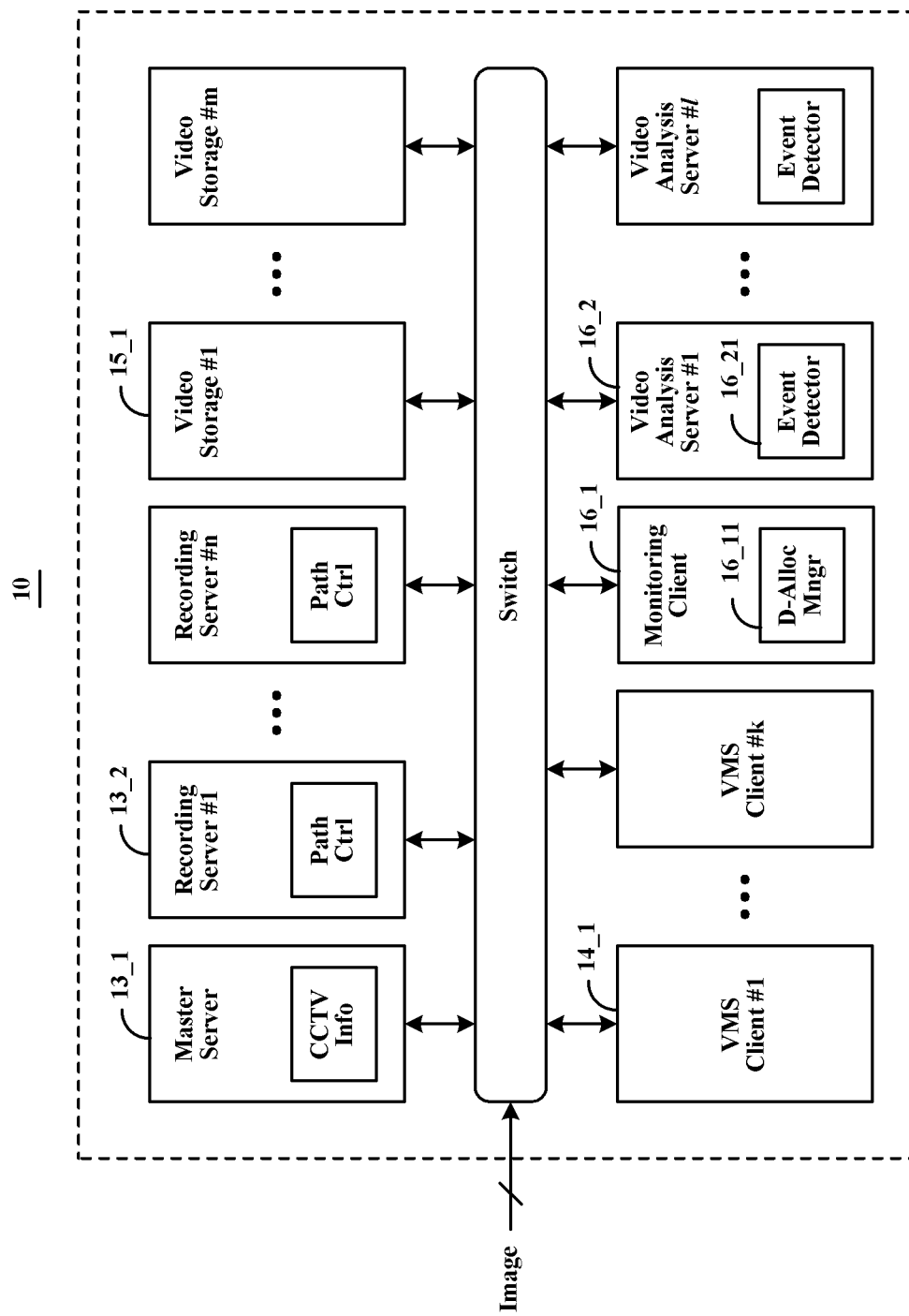
FIG. 2 is a block diagram illustrating an embodiment of the integrated control system of FIG. 1.

More specific operation of the embodiment of the present invention shall be described below. FIG. 2 is a block diagram illustrating an embodiment of the integrated control system 10 of FIG. 1.

As shown in FIG. 2, the integrated control system 10 may include master server 13_1, at least one storage/distribution server 132, at least one VMS client 14_1, at least one video storage 15_1, monitoring client 16_1, and at least one video analysis server 16_2. The components of the integrated control system 10 may be interconnected via a switch. The video ('Image') from a plurality of CCTV's may be supplied through the switch. The Monitoring client 16_1 may include dynamic allocation manager 16_11, and the video analysis servers 162 may include event detector 16_21.

According to a request from the monitoring client 16_1, the video analysis servers 16_2 may perform video analysis operation for event detection. With reference to predefined assignment information, each of the video analysis servers 16_2 may receive video from at least one CCTV and then perform analysis operations thereon. Let's assume that thousands of CCTV's are installed in a zone where the integrated control system 10 provides management, and further assume that each of the video analysis servers 16_2 takes charge of analyzing video from 10 CCTV's. Then, video (i.e., video stored in the video storage) from 10 CCTV's may be provided to each of the video analysis servers 16_2 with reference to predefined assignment information.

The event detector 1621 may detect events based on result of the video analysis. The events may be detected in a variety of situations. For example, an event may be detected when the video contains various singular behaviors (e.g., prowling, intrusion, crowding, losting of belongings, etc.) or specific objects (e.g., people, color, size, speed, vehicle, etc.). The detection results of the event detector 16_21 may be provided to the monitoring client 16_1. For example, event type, CCTV ID which has detected the event, time and date when the event is detected.

The monitoring client 16_1 is provided with video where an event is detected, by which the operator of the monitoring client 16_1 may confirm and monitor the corresponding video. For example, the event-detected video may be provided from the video analysis servers 16_2. Alternatively, the event detection result may be provided to other server (e.g., master server or storage/distribution server), and then the video which is stored in the video storage 15_1 may be provided to the monitoring client 16_1 by control operation of the master server or storage/distribution server The dynamic allocation manager 16_11 may manage dynamic allocation of the plurality of CCTV's with reference to various kinds of information which is received in accordance with the detection result. For example, the dynamic allocation manager 16_11 may have table information which is related to the plurality of CCTV's. The CCTV table information may include ID information and location information, such as latitude and longitude, of a plurality of CCTV. By analyzing the information received from the video analysis servers 16_2 as well as the CCTV table information, the dynamic allocation manager 16_11 may manage dynamic allocation for the plurality of CCTV's.

In an example, when ID information is identified of the CCTV's which have taken the event-detected video, the distances are calculated between the event-detecting CCTV and its neighboring CCTV's with reference to the CCTV table information. Then, the relatively closer neighboring CCTV's are selected. The above-selected neighboring CCTV's are allocated to the video analysis servers 16_2 as the correlated CCTV's for the event-detecting CCTV. Depending on the number of the correlated CCTV's which are selected above, the correlated CCTV's may be allocated to one video analysis server 16_2 or more than one video analysis servers 16_2.

Alternatively, other criteria may be adopted in selecting the correlated CCTV's. For example, if an event is detected from the video of a CCTV which is placed in a position of the road, its neighboring CCTV's which are installed on high potential of destination for the object in view of the road characteristics may be selected as the correlated CCTV's. When the correlated CCTV's are selected by the above-described dynamic allocation operations, the ID information corresponding to the selected correlated CCTV's may be provided to the video analysis servers 16_2.

In accordance with the newly-allocated correlated CCTV's, the video analysis servers 16_2 shall receive videos which are generated by different neighboring CCTV's so as to perform analysis operations thereon. By the dynamic allocation as above, the video analysis servers 16_2 shall perform analysis operations on CCTV videos which may have higher potential of event detection. When an event is detected in the video from the newly-allocated CCTV's, the video analysis servers 162 provides the information thereof back to the monitoring client 16_1. Then, the monitoring client 16_1 reperforms the dynamic allocation based on the received information, and correspondingly assigns another correlated CCTV's to the video analysis servers 16_2.

As shown in FIG. 2, the master server 13_1 may have CCTV information table. That is, the CCTV information table may be stored both in the master server 13_1 and the monitoring client 16_1. The CCTV information table may be interlocked between the master server 13_1 and the monitoring client 16_1. Therefore, when it happens any change in information of the CCTV's, the master server 13_1 may update the CCTV table information in the monitoring client 16_1.

As shown in FIG. 2, the storage/distribution server 13_2 may include path controller (Ctrl Path). The path controller (Ctrl Path) may perform switch control so as to control the pathway of the video ('Image') in the integrated control system 10. Further, the above-described event detection operation and dynamic allocation operation may be performed in real-time manner. In other words, regarding the video ('Image') which is supplied to the switch, its pathway may be controlled by the storage/distribution server 13_2. The videos of the CCTV's which are selected in accordance with the dynamic allocation may be provided to the video analysis servers 16_2. The result of the dynamic allocation may be provided to the master server 13_1 and/or the storage/distribution server 13_2 from the monitoring client 16_1. The video of the dynamically allocated (or, the newly selected) correlated CCTV's may be provided to the video analysis servers 16_2 by control of the switch.

Figure 3:
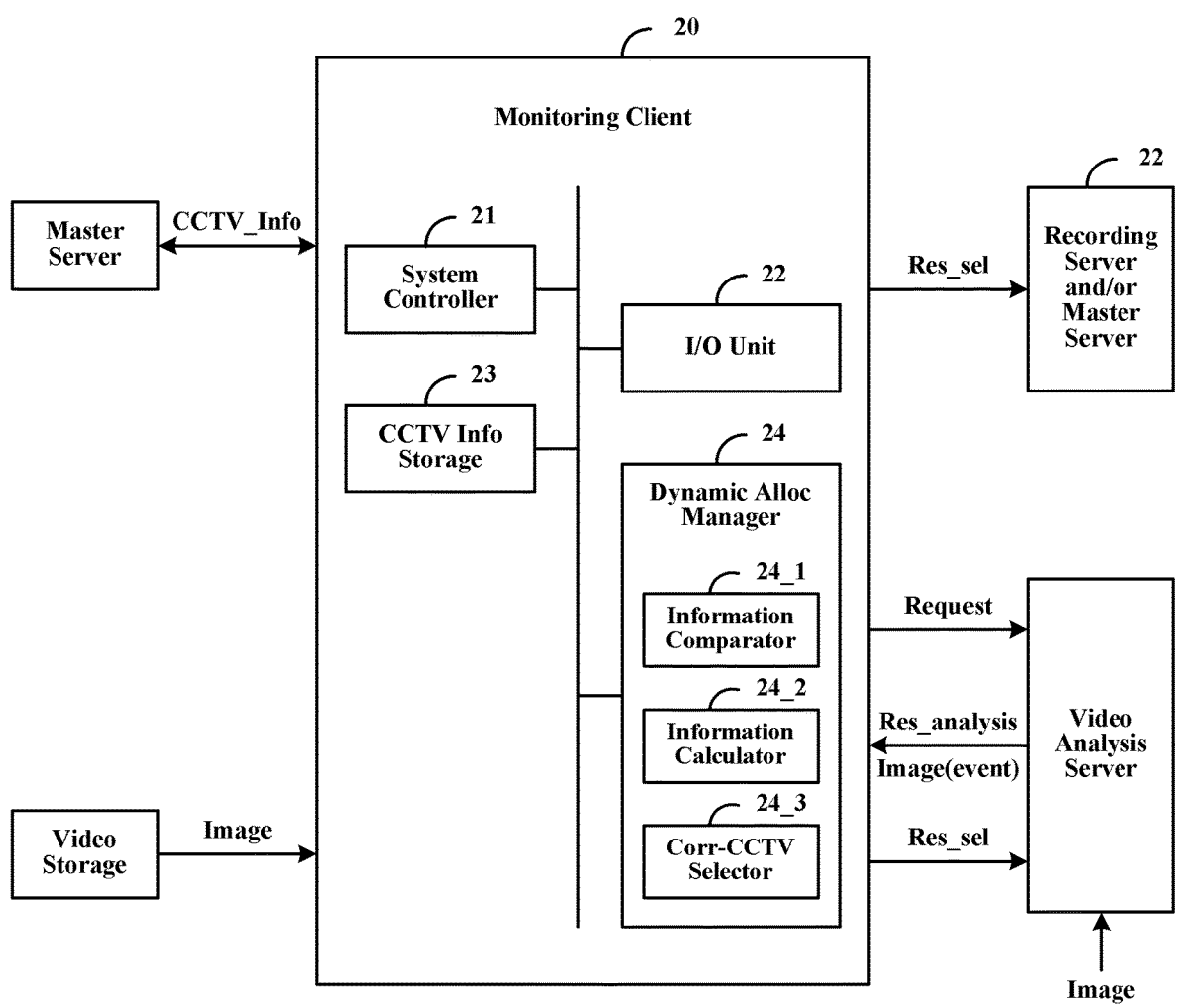
FIG. 3 is a block diagram illustrating an embodiment of the monitoring client of FIG. 1.

FIG. 3 is a block diagram illustrating an embodiment of the monitoring client of FIG. 1. In FIG. 3, in addition to the monitoring client 20, there are further illustrated the master server, the video storage, the storage/distribution server and the video analysis server which are associated thereto.

The monitoring client 20 may include system controller 21, I/O unit 22, CCTV information storage 23 and dynamic allocation manager 24. The dynamic allocation manager 24 may include information comparator 24_1, information calculator 24_2 and correlated CCTV selector 24_3.

The system controller 21 generally controls the operation of the monitoring client 20. In an embodiment of the invention, the system controller 21 may control the dynamic allocation manager 24 so as to make the dynamic allocation of the plurality of CCTV's be performed by the event detection result in a same or similar fashion. The I/O unit 22 performs communication of the monitoring client 20 with peripheral servers or clients so as to input or output various kinds of information. The CCTV information storage 23 may store various kinds of information which is related to the plurality of CCTV's, e.g, ID information and location information of CCTV's.

The information comparator 24_1 of the dynamic allocation manager 24 may compare the ID information of the CCTV which obtaining the event-detected video with the information in the CCTV information storage 23. Based on the comparison result, at least one neighboring CCTV may be identified which are correlated with the event-detecting CCTV in various factors.

The information calculator 24_2 may perform various arithmetic operations using the location informations of the event-detecting CCTV and its neighboring CCTV's. As an embodiment, the distances are calculated between the event-detecting CCTV and its neighboring CCTV's in accordance with the arithmetic operations. The correlated CCTV's may be selected based on the calculated distances.

The correlated CCTV selector 24_3 may select at least one neighboring CCTV as the correlated CCTV, in which the neighboring CCTV's are related with the event-detecting CCTV based on the comparison result and/or the calculation result. For example, there may be selected at least one CCTV which are related with the event-detecting CCTV based on the comparison result (e.g., CCTV's on the same road). Alternatively, there may be selected CCTV's which are installed within a predetermined distance from the event-detecting CCTV in accordance with the calculation result. When the correlated CCTV's are selected, their ID information may be provided to the outside.

More detailed operation of the monitoring client 20 with reference to the components shown in FIG. 3 shall be described below.

The monitoring client 20 may update the CCTV information table in association with the master server. Further, the monitoring client 20 may provide a request for event detection ('Request') to the video analysis server. The video analysis server may receive videos from at least one CCTV according to predetermined allocation information so as to perform analysis operation thereon. When analyzing the pre-stored video, the video in the video storage ('Image') may be provided to the video analysis server. On the other hand, when analyzing the real-time video, the video ('Image') may be provided to the video analysis server in real-time manner under the control of the storage/distribution server.

The video analysis server may provide the monitoring client 20 with the analysis result ('Res_analysis') including the event detection result. In addition to the analysis result, the monitoring client 20 may be further provided with the video where the event is detected ('Image (event)'). The dynamic allocation manager 24 of the monitoring client 20 may perform the operation of selecting the correlated CCTV's according to the above-mentioned embodiment, and may output the selection result ('Res_sel'). The selection result ('Res_sel') may be provided to a variety of other servers and/or clients, e.g., to at least one of the video analysis server, the master server and the storage/distribution server.

The video analysis server may perform the analysis operation on video from new (i.e., other) correlated CCTV's in accordance with the allocation result. For example, based on the control operation of at least one of the master server and the storage/distribution server, the correlated CCTV's may be dynamically allocated to the video analysis server and the video from the correlated CCTV's may be provided to the analysis server. The video analysis server may perform the event detection on the video from the correlated CCTV's and then provide the detection result. The monitoring client 20 may perform again the dynamic allocation for CCTV's based on the event detection result.

Figure 4:
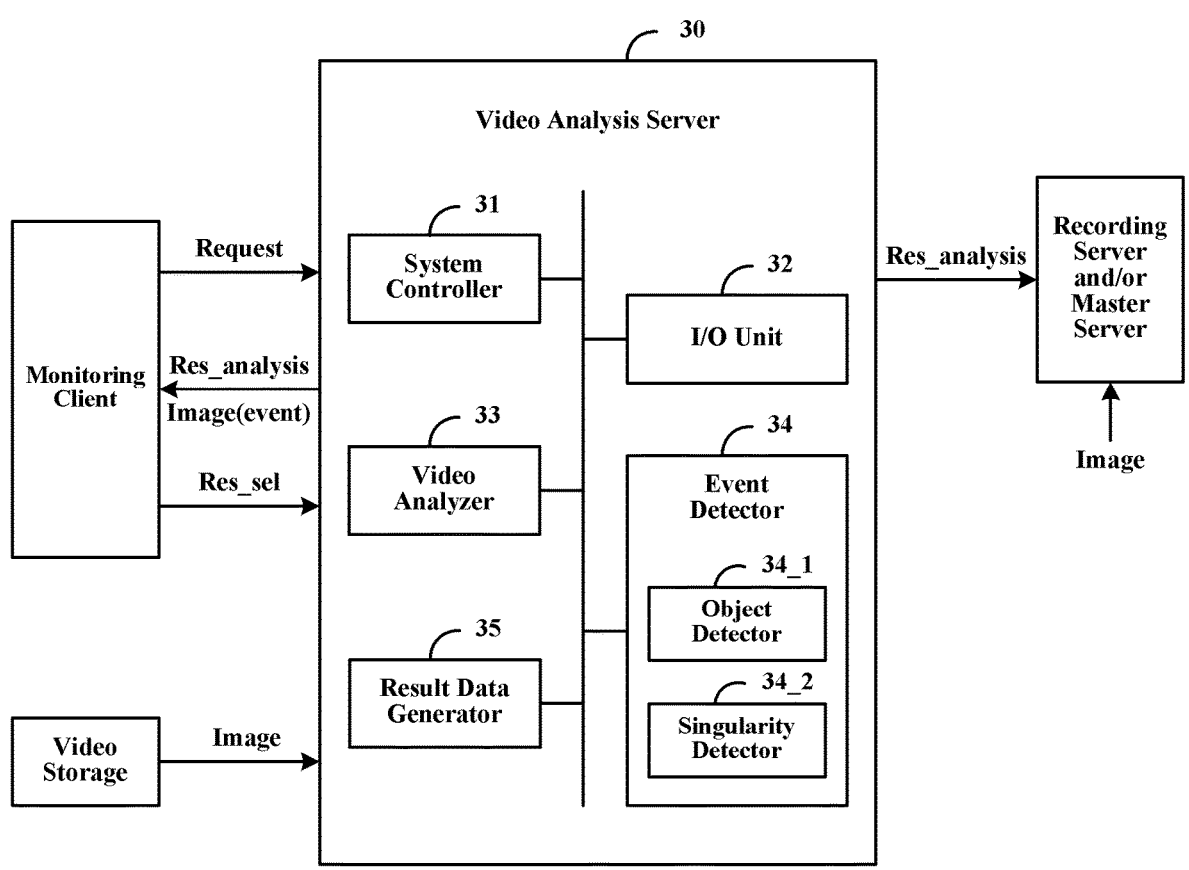
FIG. 4 is a block diagram illustrating an embodiment of the video analysis server of FIG. 1.

FIG. 4 is a block diagram illustrating an embodiment of the video analysis server of FIG. 1. In FIG. 4, in addition to the video analysis server 30, there are further illustrated the monitoring client, the video storage and the storage/distribution server which are associated thereto.

The video analysis server 30 may include system controller 31, I/O unit 32, video analyzer 33, event detector 34 and result data generator 35. Further, the event detector 34 may include object detector 34_1 and singularity detector 34_2. In FIG. 4, the video analyzer 33 and the event detector 34 are shown as separate function blocks. However, they may be defined as being included in a single function block. In addition, the object detector 34_1 and the singularity detector 34_2 of the event detector 34 are shown as separate function blocks. However, they may be defined as being included in a single function block so as to detect objects or singular situations.

The system controller 31 generally controls the operation of the image analysis server 30. In an embodiment of the invention, the system controller 21 provides control so that the video analyzer 33 analyzes video responding to the video analysis request ('Request') from the monitoring client, and further so that the event detector 34 performs event detection operation based on the video analysis result. The Video analyzer 33 receives video from the correlated CCTV's and perform analysis operations for the video, in which the correlated CCTV's are selected based on the dynamic allocation result. The object detector 34_1 may determine based on the video analysis result whether there is an object in the video which may be classified in a predetermined category, and then may generate the detection result. The singularity detector 34_2 may determine based on the video analysis result whether there is an singular situation in the video which may be classified in a predetermined category, and then may generate the detection result.

The result data generator 35 may generate the result data based on the results of the above-described analysis and/or detection. The result data may include various kinds of information, e.g., the ID information of the event-detecting CCTV, the type of event, time and date of the event detection, etc. as described above. The result data may be provided as the analysis result ('Res_analysis'). The analysis result ('Res_analysis') may be provided to the external servers and/or clients, e.g., the monitoring client and the storage/distribution server. The monitoring clients may generate the selection result of the correlated CCTV's ('Res_analysis') by performing dynamic allocation based on the analysis result ('Res_sel'). The storage/distribution server may control the video pathways based on the analysis result ('Res_analysis') and the selection result ('Res_sel').

Figure 5:
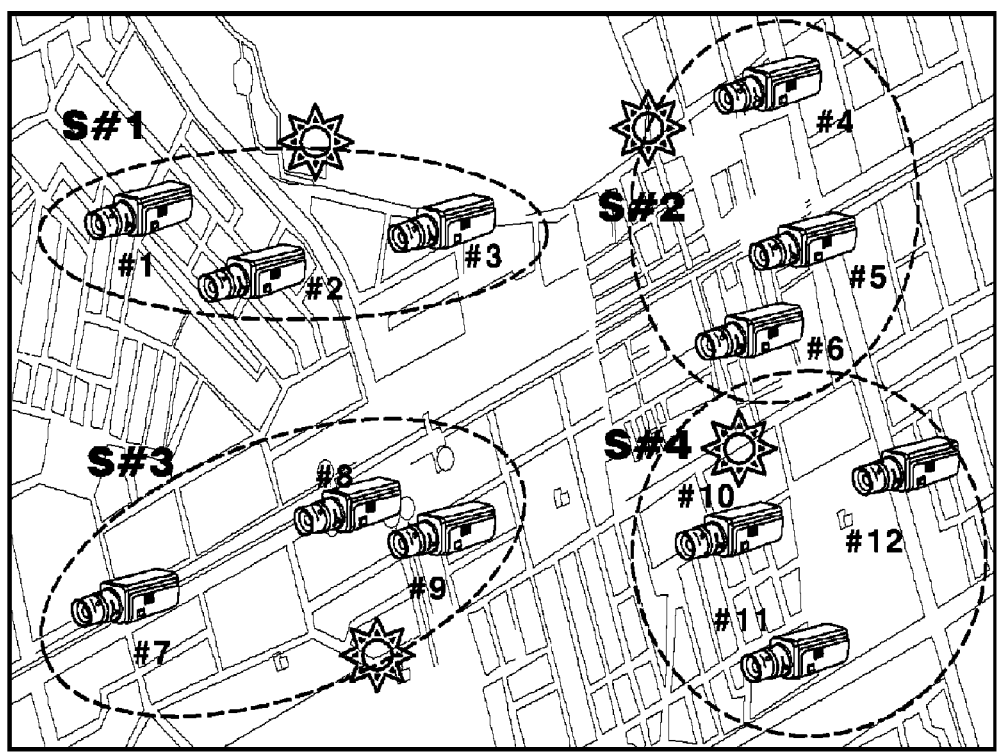
FIG. 5 is a view illustrating an example of performing intensive monitoring corresponding to the result of the dynamic allocation according to an embodiment of the present invention.

FIG. 5 is a view illustrating an example of performing intensive monitoring corresponding to the result of the dynamic allocation according to an embodiment of the present invention.

When an event occurs, at least one correlated CCTV may be selected with reference to the CCTV table information in the monitoring client. The selected correlated CCTV's may be allocated to at least one video analysis server. As an embodiment, in FIG. 5, a plurality of CCTV's are grouped into one group with reference to a scenario (e.g., a user-defined scenario). If an event occurs within a group, the CCTV's in that group may be selected as the correlated CCTV's. For example, if an event occurs in the first group (G #1), the CCTV's (#1~#3) in the first group (G #1) may be selected as the correlated CCTV's. If an event occurs in the second group (G #2), the CCTV's (#4~#6) in the second group (G #2) may be selected as the correlated CCTV's.

Further, if an event occurs in at least two groups together, the CCTV's in any of those groups may be selected as the correlated CCTV's.

FIG. 5 illustrates an example of selecting the correlated CCTV's by area-based grouping. However, embodiments of the present invention are not limited thereto. For example, it may be estimated the locations of high potential of destination for the object in view of various information such as road characteristics. The CCTV's may be grouped in considering the possibility of movement of the object. Alternatively, the grouping may be unfixed so as to change variously. For example, the CCTV's which are located within a predetermined distance from the event location may be grouped in one group so that the CCTV's in the group may be selected as the correlated CCTV's.

In accordance with the operation as described above, the control efficiency may be maximized by the intensive monitoring when an event occurs. Further, the resource of the integrated control system may be efficiently utilized.

Figure 6:
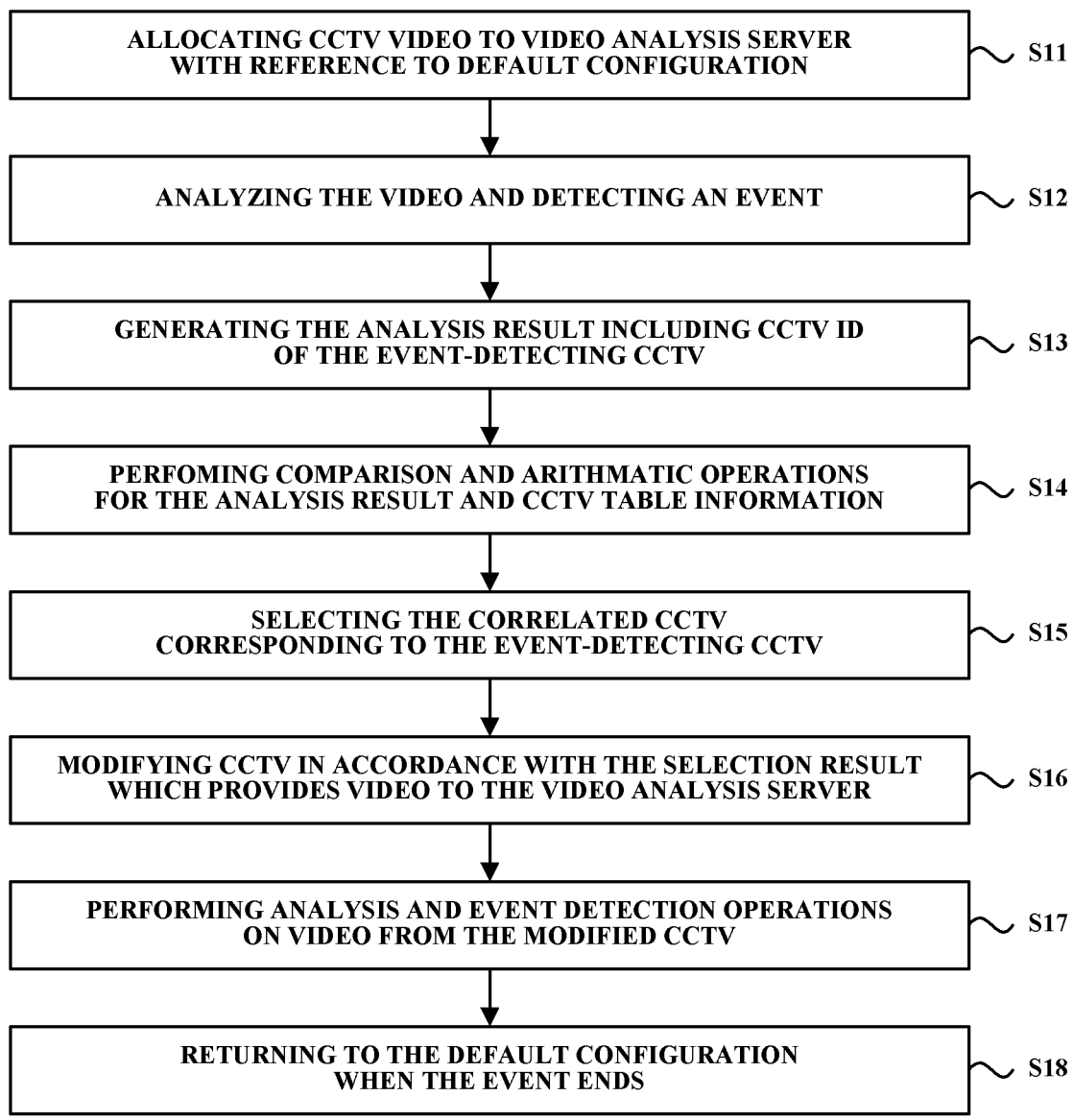
FIG. 6 is a flow chart illustrating the operation method of the integrated control system according to an embodiment of the present invention.

FIG. 6 is a flow chart illustrating the operation method of the integrated control system according to an embodiment of the present invention.

As shown in FIG. 6, a plurality of CCTV's are allocated to at least one video analysis server with reference to a predetermined default configuration (S11). Accordingly, the pathway of the videos which are provided from the plurality of CCTV's shall be controlled by operations of the switch in the integrated control system, by which the CCTV videos shall be provided to the video analysis servers according to the allocation scheme corresponding to the default configuration.

The video analysis server may perform the analysis operation on the received video so as to detect an event (S12). The video analysis server may generate the analysis result. The analysis result may include the ID information of the CCTV's which have taken the video in which the event has been detected (S13). The generated analysis result may be provided to various servers and/or clients outside of the video analysis server.

The monitoring clients may receive the CCTV table information stored therein as well as the analysis result from the video analysis server so as to perform comparison and arithmetic operations thereon (S14). According to the above-mentioned embodiment, the monitoring clients may select at least one correlated CCTV corresponding to the event-detecting CCTV (S15). The selection result may be provided to various servers and/or clients outside of the monitoring clients. The selection result may include information of allocating at least one CCTV to the video analysis server, thereby a plurality of correlated CCTV's may be allocated to at least one video analysis server. That is, in accordance with the selection result, the CCTV's which provide the video analysis server with videos may be modified (S16).

Each of the video analysis servers may receive videos from the dynamically allocated CCTV's, and then perform the analysis and event detection operations on the received video (S17). When an event is detected, the above-described steps S13 to S17 may be repeatedly performed. Then, when the event situation ends, the CCTV's may be allocated to the video analysis server in accordance with the default configuration (S18).

Figure 7:
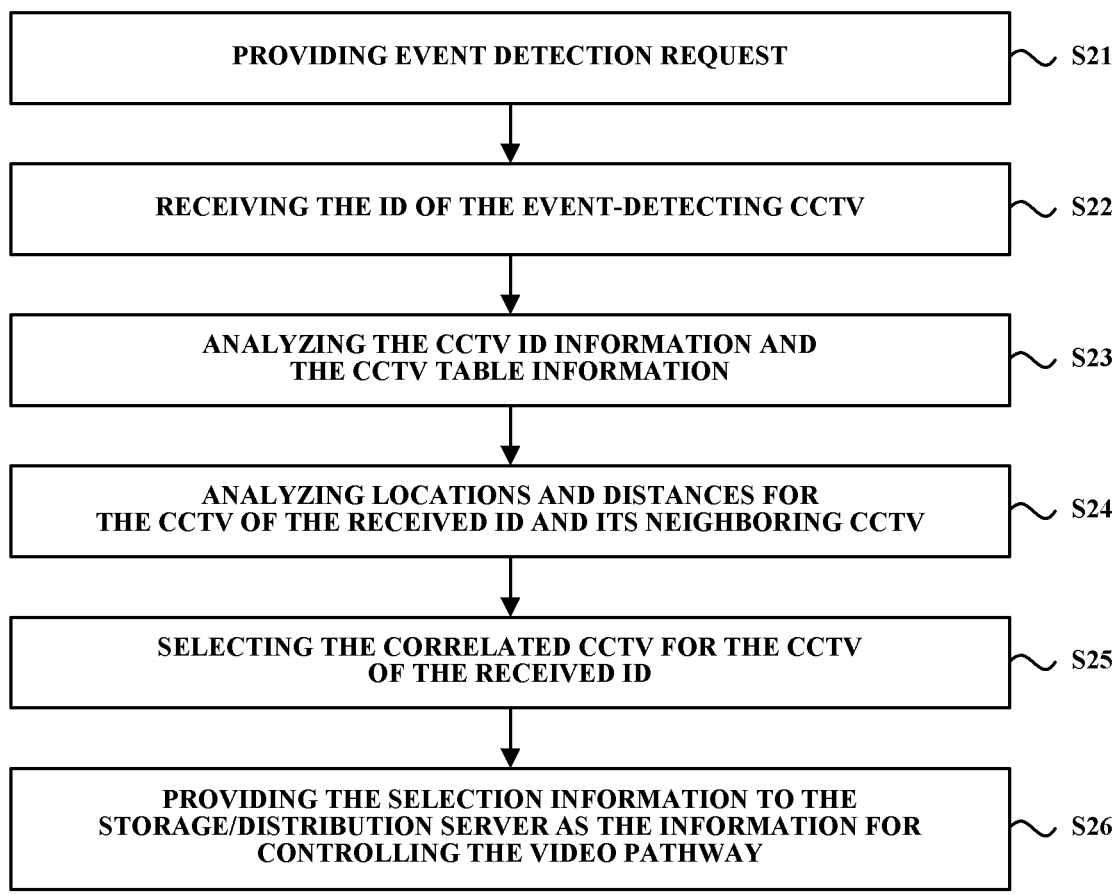
FIG. 7 is a flow chart illustrating the operation method of the monitoring client according to an embodiment of the present invention.

FIG. 7 is a flow chart illustrating the operation method of the monitoring client according to an embodiment of the present invention.

A user who manages the monitoring clients may provide an event detection request to at least one video analysis server in order to monitor and analyze the event situation (S21). If a plurality of video analysis servers is arranged, the monitoring clients may provide the event detection request to each of the plurality of video analysis servers. At this time, the CCTV's may be allocated to the plurality of video analysis servers in accordance with the default configuration. Accordingly, each of the video analysis servers may be provided with the CCTV videos in accordance with the default configuration so as to perform analysis and event detection operations thereon.

When an event is detected, the monitoring client may receive various kinds of data including the information of the event-detecting CCTV (e.g., CCTV ID information) from the video analysis server (S22). The monitoring clients analyze the CCTV table information stored therein as well as the information received from the video analysis server (S23). In accordance with the analysis result for the information, the monitoring clients may analyze the locations and distances etc. for the event-detecting CCTV (or the CCTV corresponding to the received ID) and its neighboring CCTV's (S24).

Based on the analysis result, at least one correlated CCTV which are corresponding to the CCTV of the received ID may be selected (S25). Further, the selection information which shows the result of selecting the correlated CCTV's may be provided to other servers and/or clients, e.g., to the storage/distribution server, as the information for controlling the video pathway (S26). Accordingly, the monitoring client may receive the video analysis results from other CCTV's and/or the event detection result from the video analysis server.

FIG. 8 is a view illustrating an example of CCTV table information which is stored in the monitoring client according to an embodiment of the invention.

As shown in FIG. 8, the monitoring client may store in a table the various kinds of information which is relating to the CCTV's. The CCTV table information may be interlocked between the monitoring client and the master server (not shown) as described above. For example, when it happens any change or addition in the CCTV information, they may be updated to the master server. The master server may manage to perform the periodic interlocking with the monitoring client so that the CCTV table information in the monitoring client may be updated.

When A CCTV's are installed in a predetermined zone and the integrated control system manages the A CCTV's, the CCTV table information may include various kinds of information related to the A CCTV's. For example, the CCTV table information may include the CCTV ID information and the CCTV location information such as latitude and longitude coordinates. Further, the CCTV table information may include the road information indicating which road is installed with the CCTV. Further, the CCTV table information may include the group association information for each CCTV when the A CCTV are grouped into a plurality of groups.

When the ID information of the CCTV which has taken the video where the event is detected (hereinafter referred to as 'event CCTV') is received, various kinds of information corresponding to the event CCTV are obtained. By obtaining the latitude and longitude coordinates for other CCTV's, the distances between the event CCTV and other CCTV's may be calculated. In addition, by detecting the road information for other CCTV's, it may be determined the CCTV's which are installed in the same or neighboring road where the event CCTV is installed. In addition, by detecting the group information for other CCTV's, it may be determined the same group that the event CCTV belongs to.

By referring to various information of the CCTV table information as described above, at least one correlated CCTV may be selected out of A CCTV's. In addition, according to the embodiment as described above, the videos taken by all the CCTV's which are installed in a predetermined zone may be managed to be analyzed by the video analysis server.

Figure 9:
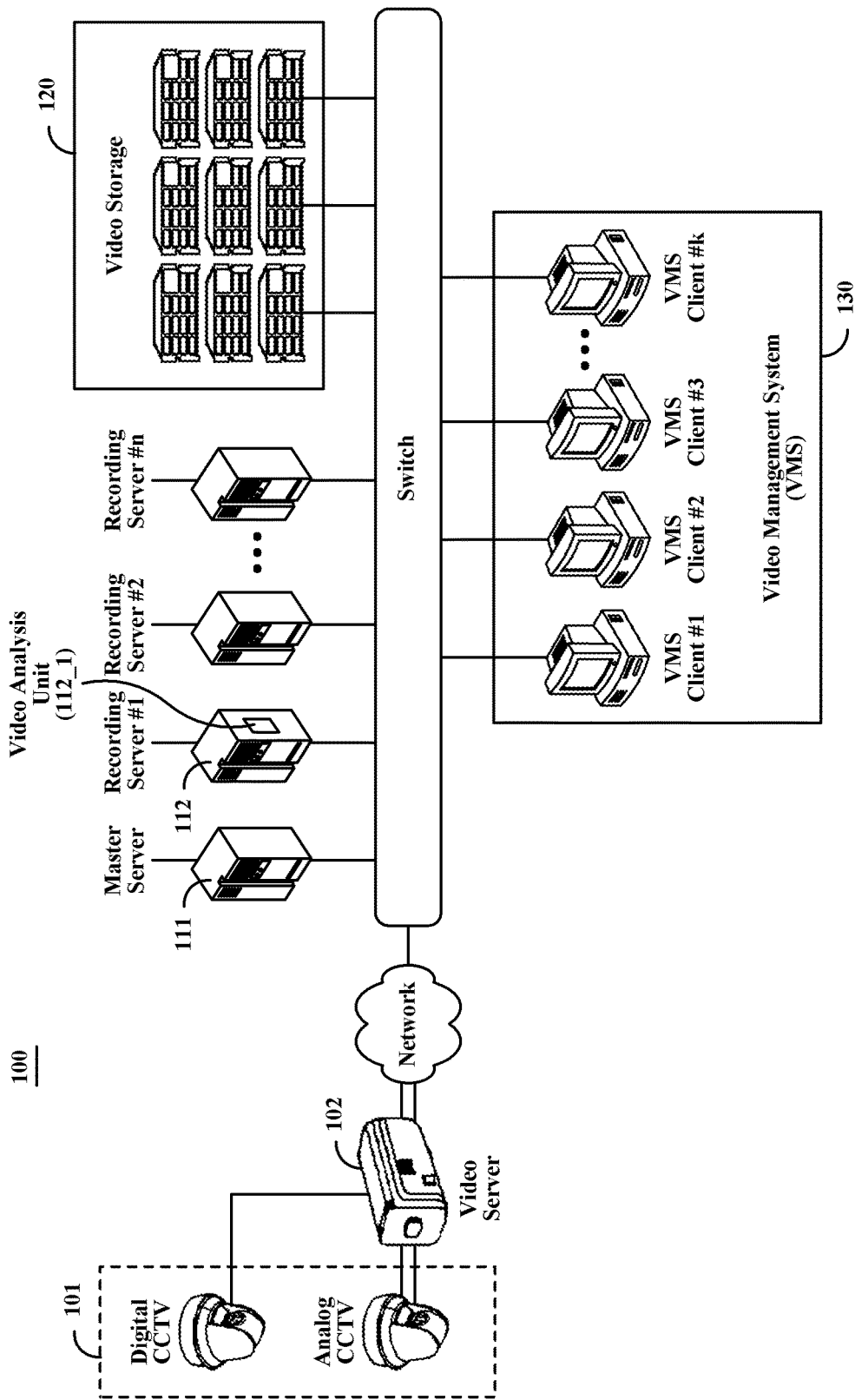
FIG. 9 is a view illustrating an integrated control system according to an embodiment of the present invention.

FIG. 9 is a view illustrating an integrated control system according to an embodiment of the present invention. As shown in FIG. 9, the integrated control system 100 according to an embodiment of the invention may include master server 111, at least one recording server (Recording Server #1~Recording Server # n) 112, video management system (VMS) 130, and video storage 120. Although unshown in FIG. 9, the integrated control system 100 may further include a separate video analysis system (VAS) so as to perform a specific analysis operation for the video.

According to an embodiment of the present invention, each of the storage/distribution servers 112 may include video analyzer 112_1. The video analyzer 112_1 may include a codec module having a function of analyzing the video. A plurality of CCTV's 101 may be allocated to a plurality of the storage/distribution servers 112, by which each of the storage/distribution servers 112 may perform analysis operation on the video from the CCTV which is allocated thereto, respectively. The allocation between the CCTV's and the storage/distribution server 112 may be variously configured, which may be managed by the master server 111. In addition, the allocation of the CCTV's to each of the storage/distribution servers 112 may vary in accordance with the management operation by the master server 111

Each of the storage/distribution servers 112 may perform real-time analysis of the received video. As an embodiment, the video analyzer 112_1 of the storage/distribution server 112 may analyze the video so as to detect any event therein. The event may be classified with reference to various types, and may be assigned a tag (TAG) according to the type of each event with reference to the classification. Accordingly, the video analyzer 112_1 may detect whether any event has occurred. The video analyzer 112_1 may generate metadata including tag information (TAG) when the event has occurred.

The metadata which is generated by the storage/distribution server 112 may be provided to the master server 111. The master server 111 may store and manage the metadata which is generated by the plurality of storage/distribution server 112 in a table format. The master server 111 may receive request information to provide a result of analyzing the singular behaviors from the user. In response to the request, the master server 111 may identify the event-detected video through metadata indexing operation, and then provides its result to the user. As an embodiment, the user may request a service of the analysis result via the VMS client of the video management system 130, and then receive the result thereof.

When a singular behavior analysis request is received from the user, the master server 111 may perform the search operation to the metadata stored therein and provides its result. Each of storage/distribution servers 112 may receive the search results from the master server 111 and further may perform the management so that the user may be provided with the video where various kinds of events which are related to the singular behavior. For example, each of the storage/distribution servers 112 may store post-analysis video in the video storage 120, and further may control the switch so that the event-detected video may be supplied from the video storage 120 to the video management system 130 in accordance with the search results. Further, various kinds of information which is related to the event (e.g., ID of the event CCTV, location and time, etc.) may be provided to the video management system 130. The various kinds of information may be provided from the master server 111 and/or storage/distribution server 112 to the video management systems 130.

Figure 10:
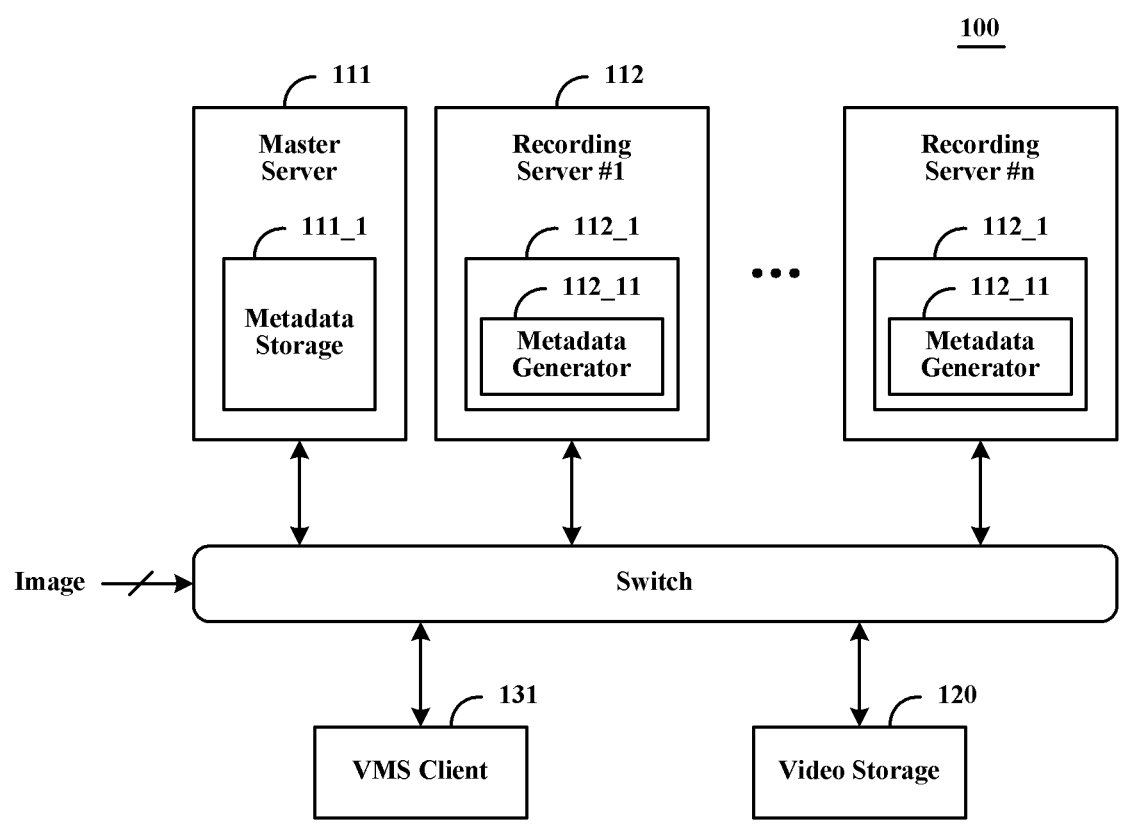
FIG. 10 is a block diagram illustrating an embodiment of the integrated control system of FIG. 9.

Referring to FIGS. 9 and 10, the master server 111 may include the metadata storage 111_1 and the video analyzer 112_1 of the storage/distribution server 112 may include the metadata generator 112_11. The components of the integrated control system 100 may be interconnected via a switch. The video ('Image') from a plurality of CCTV's may be supplied through the switch.

The videos ('Image') from a plurality of CCTV's may be allocated to a plurality of (e.g., n) storage/distribution server 112. The master server 111 may store various kinds of information which is related to the CCTV's. Under the control of the master server 111, the video ('Image') may be allocated to the storage/distribution servers 112 and each of the storage/distribution server 112 may perform the analysis operation on the allocated video ('Image'). The storage/distribution servers 112 may control the switch so that the video ('Image') may be stored in its corresponding location of the video storage 120 after completing the analysis operation. In an embodiment of the present invention, the storage/distribution servers 112 may generate metadata including the tags which correspond to the video analysis operation so as to provide the generated metadata to the master server 111.

Through the video analysis operation, the video analyzer 112_1 may identify whether any events is included in the video ('Image') such as a singular behavior. The events may be detected in a variety of situations. For example, an event situation may be detected when the video contains various singular behaviors (prowling, intrusion, crowding, losting of belongings, etc.) or specific objects (e.g., people, color, size, speed, vehicle, etc.). The metadata generator 112_11 may generate metadata based on the event detection result. For example, the metadata may include a tag (TAG) indicating the type of the detected event. In addition, the metadata may include the ID information of the event-detecting CCTV, event detection time and date, etc. The generated metadata may be provided to the master server 111.

The user who operates the VMS client 131 may need to check whether the plurality of CCTV's have taken any event situations. Therefore, the user may request via the VMS clients 131 the analysis result for the video ('Image') to the master server 111. The master server 111 may provide the result for the request from the VMS clients 131 based on the information stored in the metadata storage 111_1. If the VMS clients 131 provide the conditions of a particular event (e.g., CCTV ID, type of the event, event occurrence time, event occurrence location, etc.) as an index, the master server 111 may immediately perform search operation by corresponding indexing operation. As the result of the search, the master server 111 may provide various kinds of information corresponding to user's requests to the VMS clients 131. The master server 111 may provide the search results to the storage/distribution server 112. The storage/distribution server 112 may provide the video which is stored in the video storage 120 to the VMS clients 131 with reference to the search result.

According to an embodiment of the invention, a plurality of storage/distribution servers 112 is arranged for the plurality of CCTV's. The video analysis unit 112_1 of the storage/distribution server 112 may include a codec module for performing image processing for its allocated video. The feature points of the objects in the video are analyzed by the codec module, by which the events are detected and the metadata is generated corresponding to the event detection result. In addition, a plurality of CCTV's are appropriately allocated to a plurality of storage/distribution servers 112 so that the video analysis operations may be performed in the distributed parallel processing manner, by which the real-time analysis of the video ('Image') may be enabled. That is, by generating and managing the metadata-indexable data in the time of storing the video, it is possible to save time and system resources which are required for event search, e.g., singular behavior or objects, in response to user requests.

Figure 11:
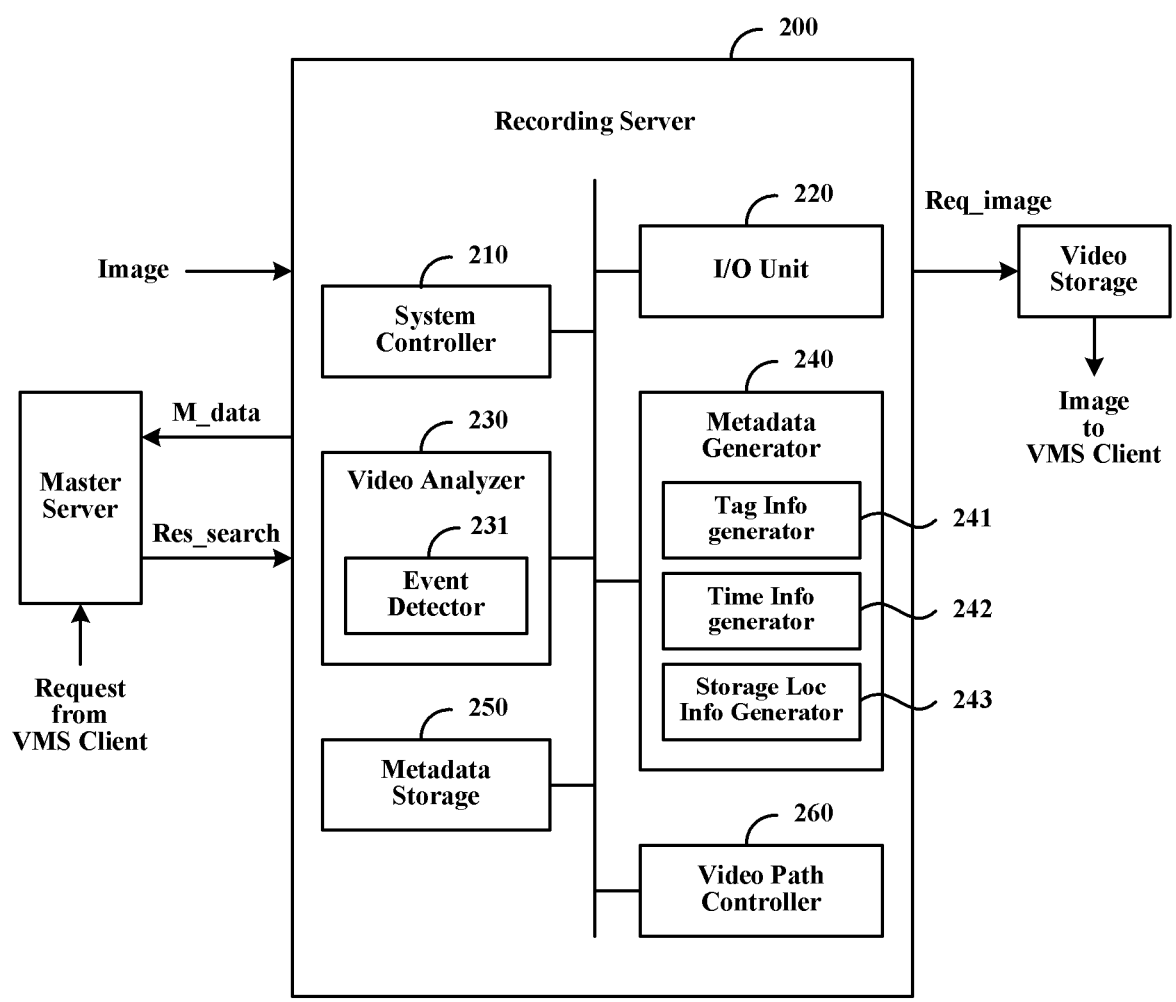
FIG. 11 is a block diagram illustrating an embodiment of a storage/distribution server of FIG. 9.

FIG. 11 is a block diagram illustrating an embodiment of a storage/distribution server of FIG. 9. In FIG. 11, in addition to the storage/distribution server 200, there are further illustrated the master server and the video storage which are associated thereto.

The storage/distribution server 200 may include system controller 210, I/O unit 220, video analyzer 230, metadata generator 240, metadata storage 250, and video path controller 260. The video analyzer 230 may include event detector 231, and the metadata generator 240 may include tag information generator 241, time information generator 242, and storage location information generator 243. The video analyzer 230 and the metadata generator 240 may be components which are included in the video analyzer 1121 of FIG. 9.

The System controller 210 generally controls the operation of the storage/distribution server 200. In an embodiment of the invention, the system controller 210 may control the video analyzer 230 and the metadata generator 240 so as to make the video analysis and metadata generation be performed in a same or similar fashion. The I/O unit 220 performs communication of the storage/distribution server 200 with peripheral servers or clients so as to input or output various kinds of information.

The video analyzer 230 performs the analysis operation on the video from the CCTV's which are allocated to the storage/distribution server 200. As described above, when the integrated control system is provided with videos from a plurality of CCTV's, the video analyzer 230 analyzes in real-time manner the video from the allocated CCTV's so as to provide the analysis result. The analysis operation may be analyzing characteristic points in the CCTV video so as to recognize specific actions or objects therefrom. The event detector 231 may detect whether the corresponding video contains any event situation based on the specific actions or objects recognized above. In an example, even if a specific action or object is recognized in the video, the event detector 231 does not detect the event if it is not a singular event situation.

The metadata generator 240 may generate metadata in accordance with the event detection result. The tag information generator 241 may identify type of event with reference to the event detection result so as to generate a tag corresponding to the type of event. The time information generator 242 may generate time-related information such as date or time of event occurrence by referring to information that may be included in the event-detected video. The video may be stored in a specific location in the video storage (not shown) under the control of the storage/distribution server 200. The storage location information generator 243 may generate information indicating the location of the video storage in which the event-detected video is stored.

The metadata storage 250 may store the generated metadata. That is, in the above-mentioned embodiment, the metadata is described as being stored in the master server. However, in a modified embodiment, the metadata may be stored in the storage/distribution server 200. Further, the video path controller 260 may control the video pathway by controlling the switch which is provided for storing the video supplied to the integrated control system in the video storage.

According to the above-mentioned embodiment, the videos ('Image') from external CCTV's are provided to the storage/distribution server 200, whereas metadata ('M_data') which is based on the analysis result thereof is provided to the master server. When event search request ('Request') from the VMS client is provided to the master server, the master server provides the search result thereof ('Res_search') to the storage/distribution server 200. The storage/distribution server 200 provides video transmission request ('Req_image') to the video storage, whereas the video storage may provide the video corresponding to the event search result to the VMS client.

Figure 12:
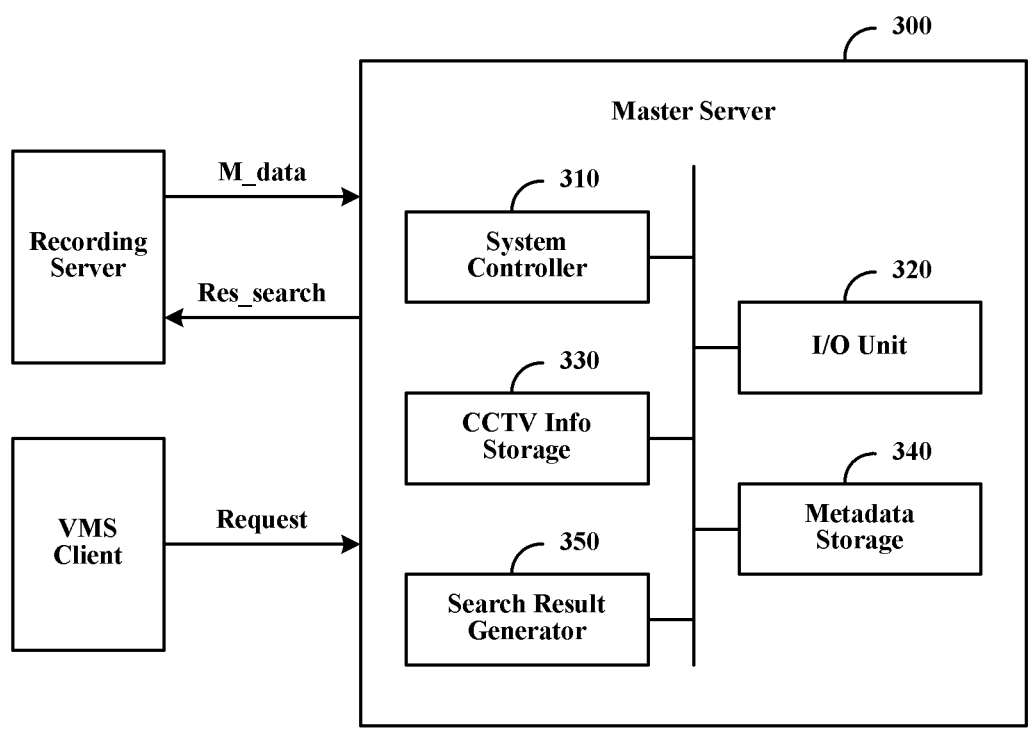
FIG. 12 is a block diagram illustrating an embodiment of master server of FIG. 9.

FIG. 12 is a block diagram illustrating an embodiment of master server of FIG. 9. In FIG. 12, in addition to the master server 300, there are illustrated the VMS client and the storage/distribution server which are associated thereto.

The master server 300 may include system controller 31, I/O unit 32, CCTV information storage 330, metadata storage 340, and search result generator 350. The system controller 310 generally controls the operation of the master server 300. In an embodiment of the invention, the system controller 310 may perform the operation of storing the metadata ('M_data') which is provided from the storage/distribution server as well as the operation of generating the search results ('Res_search') responding to the event search requests ('Request') of the VMS client.

The CCTV information storage 330 may store information of a plurality of CCTV's which are installed in a zone where the integrated control system provides management. For example, CCTV information storage 330 may store the ID information of each CCTV, the location information of each CCTV, such as latitude and longitude coordinates, and the allocation information between the CCTV's and the storage/distribution servers.

In accordance with the above-mentioned embodiment, the metadata storage 340 may store the metadata which is provided from the storage/distribution server. The search result generator 350 may perform search operation in response to the event search request ('Request') from the VMS client so as to generate the result thereof ('Res_search'). The search result generator 350 may search the information which is stored in the metadata storage 340 so as to generate search result which includes various kinds of information related to the event-detected video. For example, the search result ('Res_search') may be provided so as to include type of event, time and location of event occurrence, the location in which the event-detected video is stored. Further, the event search request ('Request') may be variously performed. For example, the user may provide indexes via the VMS client so as to provide the event search request under a specific condition. The search result generator 350 may perform the search operation in accordance with the received indexes, and then may provide the search results thereof ('Res_search').

FIG. 13 shows an example of metadata which is stored on the master server, i.e., which is generated by the storage/distribution server. FIG. 14 shows an example of TAGs corresponding to event types. Referring to FIGS. 13 and 14, an embodiment of the present invention shall be described below.

As shown in FIG. 13, metadata including various kinds of information may be generated according to the video analysis result. For example, the metadata may include at least one tag (TAG1, TAG2) indicating the type of event, Time/Date information (Info_TD) indicating time and date of the event occurrence, CCTV ID information (Info_ID) of the event-detecting CCTV, and location information (Info_sav) indicating the location in which the event-detected video is stored. The metadata may have a format by which the master server can perform indexing in view of the tags and various information described above.

The types of event may be variously classified, and a variety of tag values may be defined in accordance with the classification result. For example, the first tag (TAG1) is information indicating a superset (i.e., a main category) of the types of event. In accordance with the characteristics of the detected events, the first tag (TAG1) may have the value of '01' in case of detecting a predetermined singular behavior, whereas the first tag (TAG1) may have the value of '10' in case of detecting a specific object.

Further, a plurality of small categories may be defined for each of the main category. For example, the singular behavior may be classified into various sub-concepts. The singular behavior defined by the first tag (TAG1) may include prowling/intrusion, crowding, losting of belongings, etc. Further, the object defined by the first tag (TAG1) may include people, color/size, speed/vehicle, etc. For each of the singular behaviors by the first tag (TAG1), distinct values of the second tag (TAG2) may be defined. Further, for each of the objects by the first tag (TAG1), distinct values of the second tag (TAG2) may be defined.

The metadata as shown in FIG. 13 may be generated for each of videos which are provided from a plurality of CCTV's.

In case that no event is detected from the video, the first and second tags (TAG1, TAG2) are generated so as to illustrate the absence of singular behaviors or objects along with the metadata such as the time/date information, ID information, storage location information, etc. being generated for the video. Alternatively, in case that an event of the singular behavior of crowding is detected from other video, the first tag (TAG1) of '01' and the second tag (TAG2) of '010' are generated along with the metadata such as the time/date information, ID information, storage location information, etc. being generated for the video.

That is, according to FIGS. 13 and 14, each of a plurality of storage/distribution servers may perform analysis operations on the videos allocated thereto so as to generate metadata corresponding to each video. Alternatively, in a variant embodiment, the storage/distribution servers may selectively generate metadata only for the event-detected video. That is, the storage/distribution servers may perform the analysis operation for the received videos and the storing operation to the video storage, and then may generate metadata only for the event-detected video so as to provide the metadata to the master server.

Figure 15:
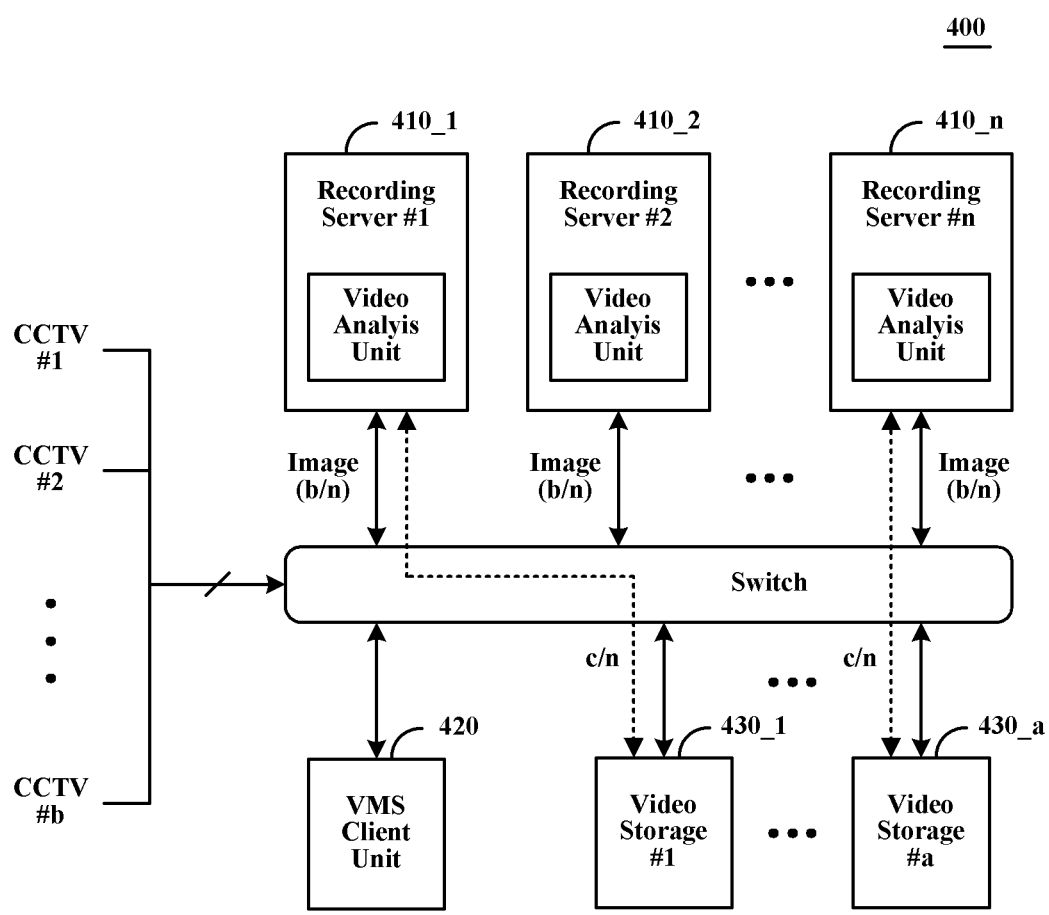
FIG. 15 is a block diagram illustrating a video pathway in the integrated control system according to an embodiment of the present invention.

FIG. 15 is a block diagram illustrating a video pathway in the integrated control system according to an embodiment of the present invention. In FIG. 15, the n storage/distribution servers (Recording Server #1~Recording Server # n) 410_1~410_n as well as the a single video storages (Video storage #1~Video storage # a) 430_1~430_a are illustrated. There are further illustrated a switch as well as the video management system 420 which comprising at least one VMS client. It is assumed that the b CCTV's (CCTV #1~CCTV # b) are installed in the zone where the integrated control system 400 provides management.

As being allocated with a plurality of CCTV's, each of the storage/distribution servers 410_1~410_n may process the video which is transmitted from the plurality of CCTV's which are allocated thereto. Preferably, each of the storage/distribution servers 410_1~410_n may be evenly allocated with video, by which each of the storage/distribution servers 410_1~410_n may receive video ('Image') from the b/n CCTV's via the switch.

Further, the videos ('Image') which are processed by the n storage/distribution servers 410_1~410_n may be provided via the switch to the a video storages 430_1~430_a. Preferably, the videos ('Image') which are processed by the n storage/distribution servers 410_1~410_n may be evenly provided to the a video storages 430_1~430_a. As an example, let's denote c as the amount of video being processed for a predetermined time in the integrated control system 400. Then, each of the storage/distribution servers 410_1~410_n may provide c/n video to the video storages 430_1~430_a.

Accordingly, each of storage/distribution servers 410_1~410_n may store the processed video in a specific area of the video storages 430_1~430_a which are allocated thereto, respectively. Accordingly, when each of the storage/distribution servers 410_1~410_n generates metadata, the information indicating the location in which the video ('Image') is stored. However, the above is proposed as an embodiment. In accordance with the amount of video ('Image') to process, each of the storage/distribution servers 410_1~410_n may utilize different size of storage.

The VMS clients of the VMS 420 may receive the video being provided to the integrated control system 400 in real-time manner. Alternatively, the VMS clients of the VMS 420 may receive the video being stored in the video storages 430_1~430_a under the control of the storage/distribution servers 410_1~410_n. Also, VMS client of the VMS 420 may provide a request to the master server (not shown) for inquiring whether any event has occurred. According to the above-mentioned embodiments, the master server may perform a search operation so as to provide the search result to storage/distribution servers 410_1~410_n. The storage/distribution server 410_1~410_n may receive the search result, and then correspondingly provide the event-detected video from the video storages 430_1~430_a to VMS 420 based on the search result.

Although the invention has been described with referring to the embodiments illustrated in the drawings, it is only proposed for exemplary purpose. Those of ordinary skill in the art will appreciate that various modifications and other equivalent embodiments thereof are available. Therefore, the technical protection scope of the invention shall be defined by the technical spirit of the appended claims.

The invention claimed is:

1. A method of operating an integrated control system, wherein the integrated control system including a master server, a plurality of storage/distribution servers, and a plurality of video storages, the method comprising the steps of:

receiving a plurality of videos from a plurality of cameras;

allocating the plurality of videos to the plurality of storage/distribution servers;

analyzing the plurality of videos in real-time manner in their allocated ones of the plurality of storage/distribution servers;

detecting an event based on the results of video analysis in any of the plurality of storage/distribution servers;

identifying types of event of the detected event, wherein the types of event include any one of the detecting singular behavior in the videos or the detecting a specific object in the videos;

generating metadata in the plurality of storage/distribution servers, wherein the metadata includes tag information which indicating the types of event of the detected event;

storing the generated metadata in the master server;

receiving a request of a VMS client (hereinafter referred to as 'client request') in the master server, wherein the request includes an index of representing condition of an event;

performing search operation in the stored metadata in the master server in response to the client request, wherein the search operation is performed with indexing operation in view of the index in the client request;

identifying the storage/distribution server which has generated the metadata being corresponding to the index in the client request (hereinafter referred to as 'event-metadata s/d server');

providing the result of the search operation to the event-metadata s/d server;

performing switch control in the event-metadata s/d server so that the videos in which the event has been detected (hereinafter referred to as 'event-detected video') shall be provided to the VMS clients; and providing at least one information of the event-detected video from the master server to the VMS clients.

2. The method according to claim 1, wherein the metadata is generated in the plurality of storage/distribution servers so as to further include tag information which indicating at least one of CCTV ID, time and date information, and location information of video storage for the event-detected video.

3. The method according to claim 1, wherein the tag information includes a first tag and a second tag, wherein the first tag indicates a main category of the types of event, wherein the second tag indicates a plurality of small categories for each of the main category, and wherein the search operation includes comparing the index in the client request with the tag information in the metadata which indicating the types of event.

\* \* \* \* \*